United States Patent [19]
Ng et al.

[11] Patent Number: 6,027,305
[45] Date of Patent: Feb. 22, 2000

[54] METHOD AND APPARATUS FOR REDUCING HIGH-CYCLE FATIGUE AND SUPPRESSING NOISE IN ROTATING MACHINERY

[75] Inventors: Wing-Fai Ng; Thomas A. Leitch, both of Blacksburg, Va.; Christopher A. Saunders, Lexington, Ky.

[73] Assignee: Virginia Tech Intellectual Properties, Inc., Blacksburg, Va.

[21] Appl. No.: 09/129,417

[22] Filed: Aug. 5, 1998

Related U.S. Application Data

[60] Provisional application No. 60/055,288, Aug. 13, 1997.

[51] Int. Cl.[7] .................................................. F01D 25/04
[52] U.S. Cl. ............................... 415/119; 415/1; 415/36; 415/30; 415/44; 415/115; 415/116; 415/118; 415/142; 415/914
[58] Field of Search .................................... 415/1, 30, 36, 415/44, 115, 116, 118, 119, 142, 914

[56] References Cited

U.S. PATENT DOCUMENTS

| | | | |
|---|---|---|---|
| 5,782,603 | 7/1998 | O'Brien et al. | 415/1 |
| 5,813,828 | 9/1998 | Norris | 415/115 |
| 5,833,433 | 11/1998 | May et al. | 415/115 |
| 5,876,182 | 3/1999 | Schulte | 415/115 |

OTHER PUBLICATIONS

Cimbala, J. M., et al., "An experimental investigation of the turbulent structure in a two–dimensional momentumless wake," *Journal of Fluid Mechanics*, vol. 213, 1990, pp. 479–509.

Dirlik, S. P., et al., "Experimental evaluation of a 50–percent thick airfoil with blowing and suction boundary layer control," AIAA–92–4500–CP, pp. 427–445.

Waitz, I. A., et al., "Preliminary assessment of wake management strategies for reduction of turbomachinery fan noise," *Journal of Propulsion and Power*, vol. 12, No. 5, Sep.–Oct., 1996, pp. 958–966.

Corcoran, T. E., "Control of the wake from a stimulated blade by trailing–edge blowing," Graduate Thesis for Lehigh University, Jan. 1992.

*Primary Examiner*—Edward K. Look
*Assistant Examiner*—Ninh Nguyen
*Attorney, Agent, or Firm*—Whitham, Curtis & Whitham

[57] ABSTRACT

A stator apparatus for mounting upstream of an intake to a rotating machine which blows pressurized air, or other media, from discharge orifices at a pressure and velocity to minimize velocity defects or turbulence in the wake of the stator prior to the plane of rotation of a rotating member of the machine. The rotating member then encounters a substantially uniform velocity medium at the plane of incidence, which substantially reduces uneven loading on the rotating member, thereby reducing noise and reducing high-cycle failure of that rotating element. The distribution and size of the orifices is determinable by placing the stator apparatus in a wind tunnel, or on the intake of a apparatus simulating the intake of the rotating machine, measuring the turbulence or velocity defects in the stator wake, and modifying the distribution and size of the orifices until the turbulence is minimized.

8 Claims, 6 Drawing Sheets

METHOD AND APPARATUS FOR REDUCING HIGH-CYCLE FATIGUE AND SUPPRESSING NOISE IN ROTATING MACHINERY

This application is a continuation of the provisional application Ser. No. 060/055,288, filed Aug. 13, 1997.

DESCRIPTION

1. Field of the Invention

This invention generally relates to the field of sound reduction for machinery and, more particularly, to sound reduction relating to air-flow over moving components of machinery.

2. Description of the Related Art

The emanation of noise from rotating machinery, which arises in part from the interaction of air or fluid in relation to the machine's operative surfaces, is well known. Examples of such rotating machinery are jet turbine aircraft engines, including the compressor blades and the inlets, fluid pump impellers, pump inlets, pump diffusers, marine propellers, HVAC equipment such as air recirculation units, air conditioners, and high speed blowers, dentist drills and snow blowers.

The noise emanating from such machinery is of increasing concern, for reasons including, for example, a greater public awareness of noise related health issues, an increasing concern over possible environmental harm from such machine noise, and an increasing number of such machines being encountered.

Accordingly, regulatory bodies and industry have instituted standards for controlling the noise generated by rotating machines. However, such standards are generally set in view of cost and engineering factors. For example, although airport regulations worldwide strive to lower the maximum allowable noise generated by commercial jet aircraft engines, it is known that conventional methods for noise reduction, such as blade, and inlet and outlet vane modifications, are costly to construct and may compromise engine power and fuel economy. Therefore, the noise standards may not be as low as environmental and other factors might otherwise dictate.

A significant cause of noise emanating from rotating machinery is a turbulence caused by blade wakes, which causes a rotor-stator wake interaction and a resulting unsteady loading on the machine components. The rotor-stator interaction and related unsteady loading produces noise and, even further, is a major cause of high-cycle-fatigue failure of compressor blades.

The related art has addressed, in a general theoretical sense, the control or lessening of blade wake as a possible means for noise reduction.

For example, an article, waitz, et al.,Preliminary Assessment of Wake Management Strategies for Reduction of Turbomachinery Fan Noise, Journal of Propulsion and Power, Vol. 12, No. 5, September-October 1996, ("the Waitz article") identifies wake management in a general sense as a possible noise reduction method. The Waitz article discusses trailing edge blowing, where air is blown from the trailing edge of a rotor blade, as one of the particular methods.

This trailing edge blowing has also been addressed, but has not been thoroughly tested and has not been implemented in an actual operational engine, by U.S. Pat. No. 5,217,349 to George Sussi, referenced as the Sussi patent. The Sussi patent identifies, in a general sense, trailing edge blowing as one of several of its proposed methods for suppressing rotor noise. However, the trailing edge blowing according to Sussi necessitates blowing passages formed within the moving or rotating rotor and the related structural requirements. Further, if such passages were to be formed in the engine rotor blade, the Sussi patent does not teach how to distribute the passages or how to implement the remainder of the apparatus.

SUMMARY OF THE INVENTION

An object of the present invention is to provide an apparatus and method for a reduction of noise from rotating machinery caused by air or fluid flow, without substantive noise absorbing structure and without substantial structure modification to the operative machine components, and without substantial degradation in machine performance.

One example embodiment of the invention comprises a stator having a discharge apparatus including an array of discrete blowing orifices, or discharge ports, the ports having a specific relation as to sizes and shapes, and being arranged in a particular pattern relative to a rotating member of a machine. The discharge ports are connected via respective discharge passages with a common passage, or plenum, which receives pressurized air from a source apparatus, so that air exits from the ports with a predetermined pressure and velocity.

Still another embodiment of the invention is a variation on the previous embodiment, having the stator arranged upstream from the rotating member of a machine such as, for example, a jet engine, at a position such that the air discharged from the stator ports re-energizes and minimizes the velocity defects occurring in the stator wake prior to the plane of rotation of the rotating member.

Still another embodiment of the present invention is a variation of the previous embodiments, wherein the discharge ports are arranged along the trailing edge of the stator and wherein a respective diameter of each of the ports increases along a direction with respect to the plenum, so that a velocity and volume of the air blown from the discharge ports is substantially constant notwithstanding a pressure gradient in the plenum.

Still another embodiment of the present invention comprises the stator discharge apparatus of the previous embodiments, with a trailing edge blowing apparatus for a rotating member of the rotating machine.

The present invention further includes a method for determining the distribution and dimensions of the ports comprising steps of constructing an apparatus according to the previous embodiments, placing the apparatus in a wind tunnel or other device simulating the airflow of a rotary machine intake, measuring the velocity defects in the stator wake, modifying the distribution and size of the ports until the velocity defects are minimized.

BRIEF DESCRIPTION OF THE DRAWINGS

The foregoing and other objects, aspects, and advantages will be better understood from the following description of preferred embodiments of the invention with reference to the drawings, in which.

DETAILED DESCRIPTION OF THE EMBODIMENTS

Pursuant to these and other objects, it will be understood that the apparatus and method of the present invention relates to various kinds of rotating machines. However, to facilitate an understanding of the invention, the example embodiments will be described in reference to a jet engine. It will be understood that the jet engine example is not limitative. Further, it will be understood that the word "air" is used because it is the medium in which the jet engine example operates, but that it encompasses whatever medium, including gases and/or fluids, which flow over the moving parts of the particular machine to which the invention is applied. It is assumed for this description that the reader is one of ordinary skill familiar with the general function and apparatus of turbofan engines. Accordingly, details of the turbofan apparatus and its general principles of operation will be omitted except where necessary for an understanding of this invention.

Referring to FIGS. 1, 2 and 3A–3C, the structure and operation of one embodiment of the invention will be described.

Figure 1:
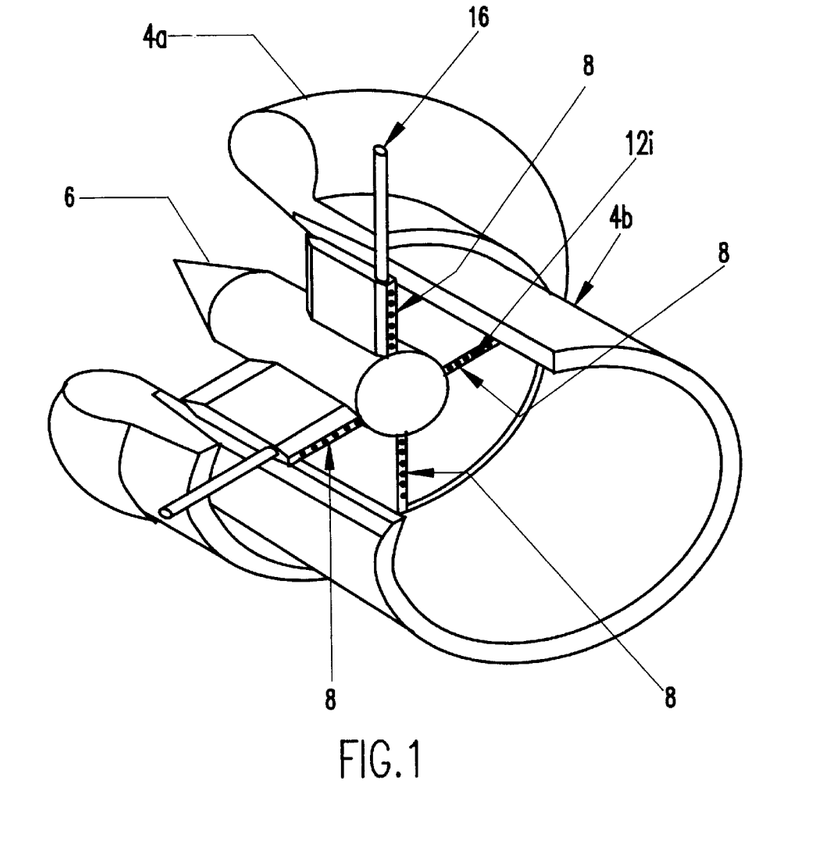
FIG. 1 is a cut-away perspective view showing one embodiment of the present invention comprising a blowing apparatus with upstream blowing struts for attachment to the inlet of a conventional turbofan engine.
Figure 2:
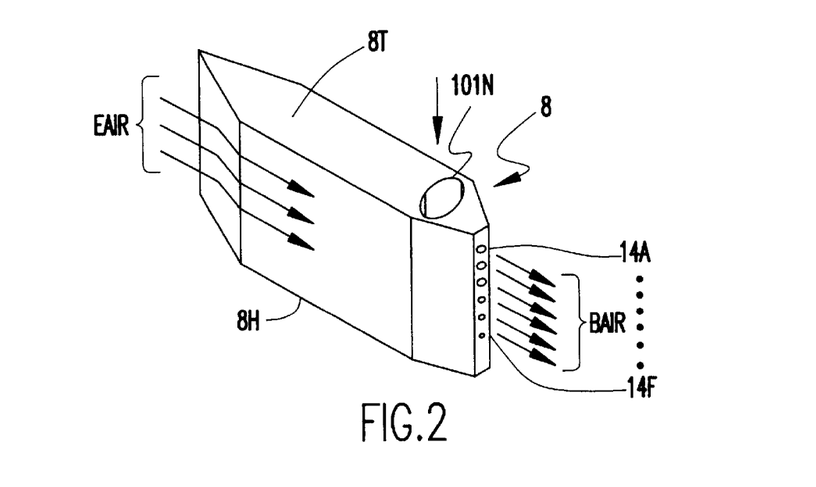
FIG. 2 is a perspective view of an example of one of the upstream blowing struts of the FIG. 1 embodiment.

The FIG. 1 structure comprises a blowing unit 2 having a bellmouth inlet 4a connected to, or integral with, an aft inlet housing 4b. The aft inlet housing 4b connects to the inlet of a rotary machine (not shown in FIG. 1) by a structure and means that are both dependent on the specific rotary machine and are readily determinable to one of ordinary skill and, therefore, will be omitted from this description.

The bellmouth and aft inlets 4a and 4b surround and are connected to a centerbody support 6 by, for this example, four blowing struts, or stator blades, each labeled as 8. The four stator blades 8 are, in the depicted example, arranged to be equally spaced 90 degrees apart from one another around the longitudinal axis (not labeled) of the center support 6.

Each of the stator blades 8 has an identical structure, shown as the generic strut in FIGS. 2 and 3A through 3C. As shown, each of the stator blades 8 is blade shaped, having a leading edge bevel LB and a trailing edge bevel EB. The vector lines EAIR represent the air flow over the struts 8 when the blowing unit of FIG. 1 is attached to the intake of an operational engine (or other air/fluid flow machine). A main air channel or plenum 10 is formed in the stator blade 8. The plenum 10 begins at a port 10IN entering the end face 8T of the blade 8, which is the end radially distant from the centerbody 6 when the blade 8 is arranged in the FIG. 1 structure, and communicates with a plurality of discharge ports $12_i$. Each of the discharge ports $12_i$ terminates at a corresponding blowing, or discharge, orifice $14_i$ located, for this example, on the trailing edge of the blade 8.

Referring to FIG. 1, a plurality of discharge feed tubes 16 pass through the aft inlet 4b, each connecting to the port 10IN of a corresponding one of the stator blades 8. A pressurized air source (not shown), or a feed for another medium for applications other than a jet engine, connects to the other end of each of the feed tubes 16. The pressurized air source could, for example, be a pressurized air bottle (not shown), an air pump (not shown), or an exhaust take-off. Further, in an application with a multistage compressor, the blowing air to the tubes 16 can be supplied from the high pressure stages (not shown) of the compressor by bleeding off air in the last few stages of the compressor.

It will be understood that the discharge tubes 16 are for purposes of example only, and that the function of providing air to the input 10IN of the stator blades 8 could be achieved by other means determinable by one of skill, such as a integral passages within the aft inlet 4b.

Figure 3A:
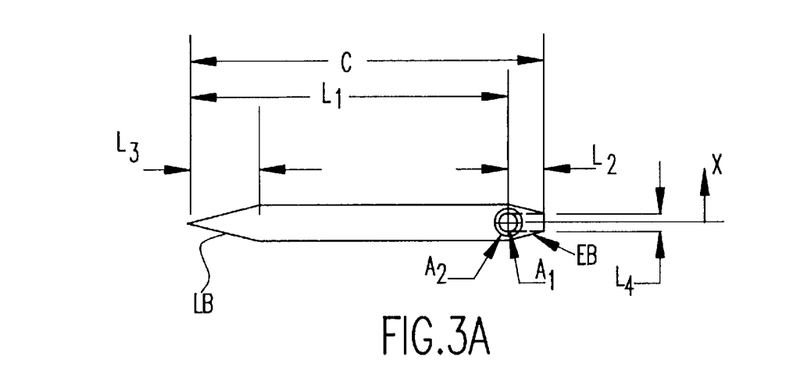
FIGS. 3A, 3B, and 3C are a top, a front, and a side projection, respectively, of an example of the upstream blowing strut of FIG. 2.
Figure 3B:
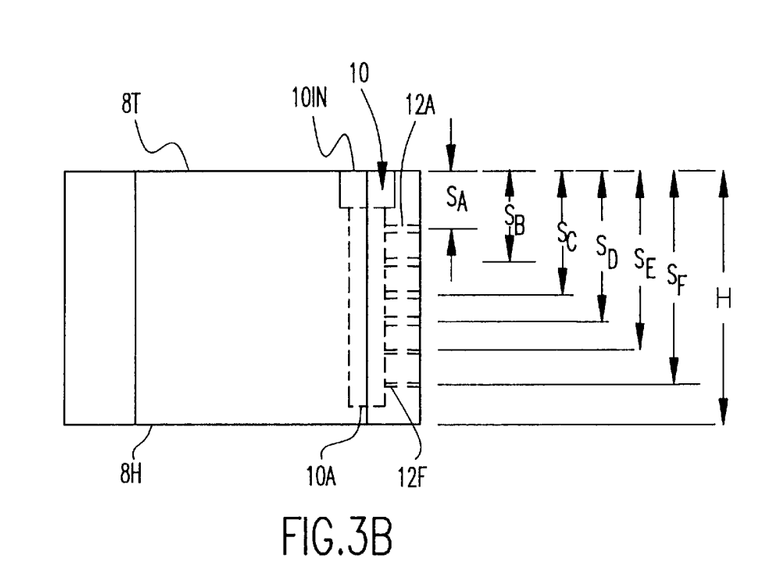
Figure 3C:
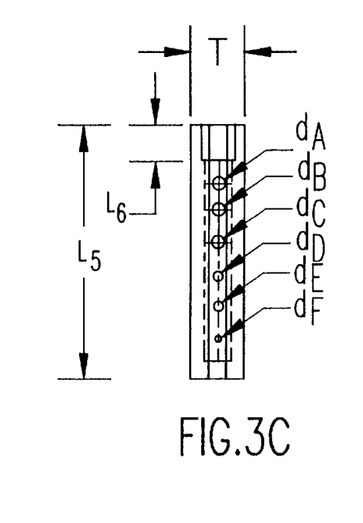

Referring to FIGS. 3A–3C, it is seen that, for this example, the plenum 10 has a uniform diameter $A_1$ along the major portion of its length, with a larger feed opening diameter $A_2$ to facilitate alignment with the air feed tube 16. This configuration of the plenum 10 is for purposes of example only and other plenum arrangements can be used.

For the depicted example of FIGS. 2 and 3A–3C, there are six discharge or blowing passages $12_i$, labeled as $12_A$ through $12_F$, and six corresponding discharge ports or blowing orifices, labeled as $14_A$ through $14_F$ respectively. Each of the blades 8 is preferably formed with an identical pattern of blowing orifices. The reason, as will be understood from this description, is that minimizing wake velocity defect is the objective of the invention and this dictates that the blades 8 create a uniform circumferential air flow around the inlet of the jet engine (or other rotating machine) to which the blowing apparatus 2 is attached.

Further, it will be understood that the FIG. 1 example is shown as having four stator blades 8 for purposes of example only. Other numbers of blades 8 can be used.

Referring to FIGS. 2 and 3A through 3C, in this example embodiment, the diameter of the discharge passage $12_i$ is largest at i=A,B and C, which is the region toward the tip 8T of the blade 8, and smallest at i=E and F which is toward the hub end 8H of the blade 8. Unless otherwise stated in this description, the word "diameter", as applied to the discharge passages $12_i$, means the smallest diameter along the length of the passage. Also, it will be assumed, unless stated otherwise, that the diameter of the discharge or blowing orifice $14i$ is the same as that of the discharge or blowing passage $12_i$. However, that assumption is for purposes of description, and is not the only means of varying the diameter, and restriction, of the discharge passages $12_i$ which is contemplated by this embodiment.

More particularly, as stated above an object of this embodiment is to minimize the velocity defects or turbulence in the wake of each of the blades 8, across the span of the blade, from 8H to 8T, before the plane of rotation of the rotating jet engine blades. The mechanism for minimizing the turbulence is that air forced through the trailing edge blowing passages 12i re-energizes the pockets of lower velocity air occurring in the wake of the blade. As a result, the rotating jet engine blades will encounter an essentially uniform incoming flow, which significantly reduces the uneven loading on the rotor blades. Further to this object, a uniform discharge rate through each of the blowing passages 12$_i$ is preferred. However, if the plenum 10 has a uniform diameter, such as shown in FIGS. 3A–3C, there will be a higher pressure at the distal end of the plenum, shown as 10A, than at the proximal end, shown as 10IN. The higher pressure is due to a back pressure from the surface 10A in reaction to the air entering the plenum 10 from the inlet 10IN. Therefore, according to this embodiment, there is a decrease, incremental from one passage 12$_i$ to the next, or by region, in blowing passage diameter $d_i$ along the strut from the tip 8T to the hub end 8H, which increases the restriction of the passages 12$_i$ as the pressure in the plenum 10 increases. With the increased restriction of the discharge passages 12$_i$ toward the plenum end 10A, the rate of air discharge through passage 12$_A$ will be approximately the same as that through the passage 12$_F$, even though there is a higher pressure from the plenum 10 into 12$_F$ than into 12$_A$.

A further factor, according to this embodiment, for selecting the diameters $d_i$ is that the velocity distribution across the wake must, preferably, be kept uniform to plus or minus 50% of the freestream value. Accordingly, along the span of the blade 8, the area of the blowing holes should not differ by more than a factor of five. In addition, the volume of the blowing air should be less than 50% of the total airflow through the rotating machine, and this factor should be considered for both the diameters and numbers of the discharge passages 12i and the pressure input to the plenum 10.

Dimensions for the blowing struts 8 of this embodiment, the plenum 10, and the blowing passages 12$_i$ and blowing orifices 14i are labeled as follows on FIGS. 3A through 3C: the stator blade thickness as T, the radial height as H, the distance from the leading edge of the blade to the center of the plenum 10 as $L_1$, the distance from the center of the plenum 10 to the trailing edge of the blade as $L_2$, the length of the bevel (not labeled) on the leading edge as $L_3$, the width of the trailing edge of the blade as $L_4$, length of the plenum 10 having the length A1 as $L_5$, the depth of the plenum opening having a diameter A2 as $L_6$, the distance of the centers of the discharge passages 12$_i$ to the radial tip 8T of the strut as Si, with i=A to F, and the diameters of the blowing passages as $d_i$, for i=A to F. For this example embodiment, the widest point of the trailing edge bevel EB is coincident with the center of the plenum 10.

Regarding particular values for the above-identified stator blade dimensions, there are at least two methods for their determination. One method, which was employed by the present inventors, is to construct a physical model of the blowing apparatus shown by FIG. 1, place the physical model in a windtunnel and, if necessary, modify and retest until the optimal dimensions are identified. For the prototype built and tested, the present inventors constructed and bench tested a series of models in a wind tunnel with no rotor downstream of the struts 8. The models contained various blowing hole 12$_i$ and 14$_i$ configurations. The best of the models was selected based on which one best minimized the velocity deficit in the wake. Then, for an actual experimentation, the blowing apparatus was mounted upstream of a turbofan simulator, simulating the arrangement of FIG. 5 with item 18 being the turbofan engine, and operated at the intended rotational speed(s) of the jet engine.

The particular turbofan simulator used by the inventors is a 4.1" simulator. A reason for employing a turbofan simulator was that the particular wind tunnel used for the first phase of the design could not create the full speed/volume air flow over the stators 8 as would occur from an actual turbofan engine. It should be noted, however, that the entire design process can be carried out on the turbofan simulator but that, frequently, the availability and cost of use of such simulators dictate the first phase of the design being carried out in a wind tunnel.

Noise measurements were taken during the actual experimentation to determine the success of the described blowing apparatus in reducing noise. Representative results of these tests are discussed below in reference to FIGS. 6, 7A and 7B.

For both the first experiment without a rotor, and the simulator mounted actual experimentation, the turbulence or velocity deficit was measured with a probe traversed in the plane of rotation of the rotor blades of the jet engine.

The dimensions of an actual physical prototype built and tested by the present inventors using this method are given in Table 1 below. It will be understood that although the above-described test method does not detect the further turbulence, if any, from the rotating jet engine blade, it was found to be sufficient for the purposes of the invention.

Another method for determining specific dimensions, which can be used in conjunction with the iterative bench test method, is to model the blowing apparatus 2 alone, or the blowing apparatus mounted to a jet engine, by computer simulation and then, by any of the several known methods for iterative parameter optimization, including methods employing computational fluid dynamics (CFD), determine the optimum dimensions and air pressures.

As stated above, the inventors built and tested an actual model according to FIGS. 1, 3 and 3A–3C, having the dimensions given in Table 1 below. These values represent only one example embodiment and are not limitative as to other values which may be used.

TABLE 1

| | |
|---|---|
| $L_1$ | 1.800" |
| $L_2$ | .288" |
| $L_3$ | .450" |
| $L_4$ | .090" |
| $L_5$ | 1.360" |
| $L_6$ | .140" |
| H | 1.500" |
| T | .250" |
| $A_1$ | .125" |
| $A_2$ | .188" |
| $S_A$ | .258" |
| $S_B$ | .424" |
| $S_C$ | .590" |
| $S_D$ | .755" |
| $S_E$ | .921" |
| $S_F$ | 1.087" |
| $d_A$ | .063" |
| $d_B$ | .063" |
| $d_C$ | .063" |
| $d_D$ | .047" |
| $d_E$ | .032" |
| $d_F$ | .032" |

Regarding the pressure of the air input to the plenum 10, optimum pressure ranges are a function of rotor rotational speeds. The pressure must be higher as the rotational speed increases. The optimum pressure that covers the whole range of rotational speed is from 15 pounds per square inch absolute (PSIA) to 450 PSIA.

Figure 4A:
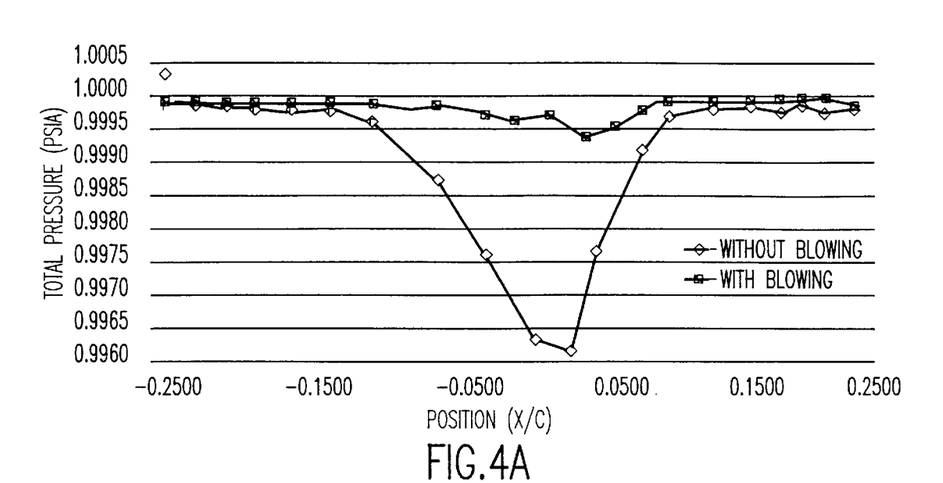
FIGS. 4A and 4B are a graphical test result, obtained by experiment of the FIG. 1 embodiment, of the reduction in stator wake velocity, at the stator tip and mid span station, respectively.
Figure 4B:
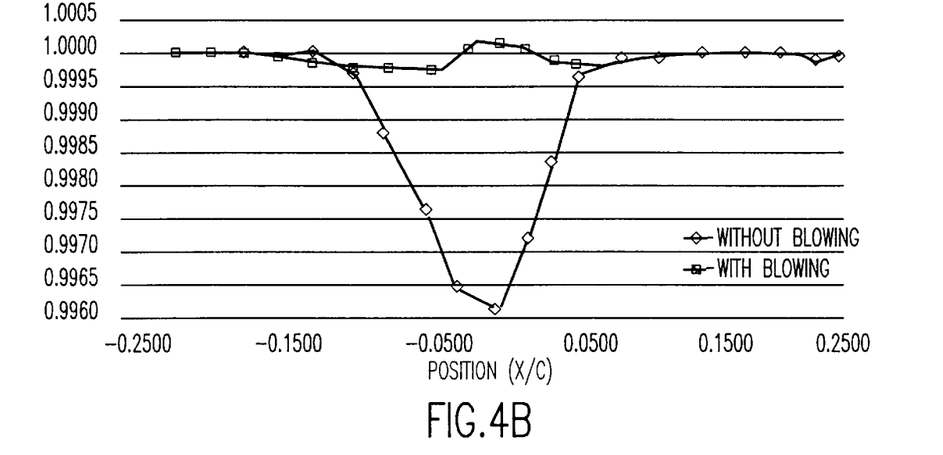

FIGS. 4A and 4B show test data for the example embodiment that was constructed according to Table 1, graphed according to the pressure in PSIA with respect to the normalized distance x/c from the stator blade 8, where x=the distance from the side of the blade 8 and c=the chord length of the stator blade 8, as shown in FIG. 3A, for the tip station and mid span station, respectively. FIGS. 4A and 4B show the reduction in the stator wake velocity defect resulting from the air discharge through the passages $12_i$, for the example embodiment that was constructed according to Table 1, with the circular points representing data obtained without air discharge and the square points representing data with the air discharge.

Figure 5:
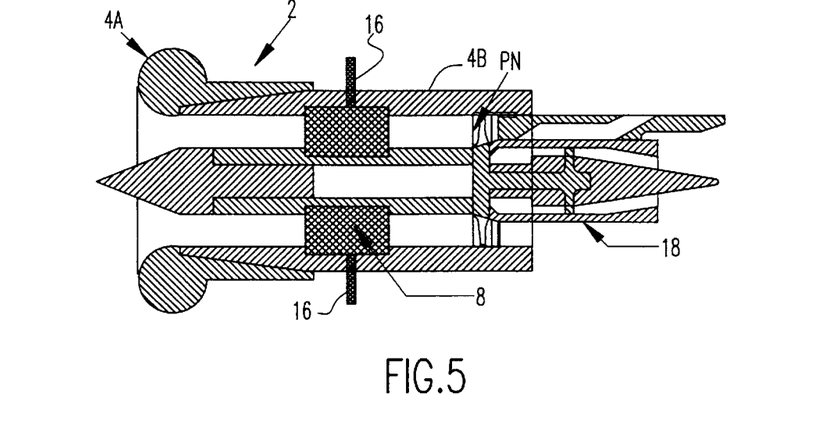
FIG. 5 is a cut-away side view of an example blowing apparatus according to FIG. 1 arranged upstream of a turbofan jet engine.
Figure 6:
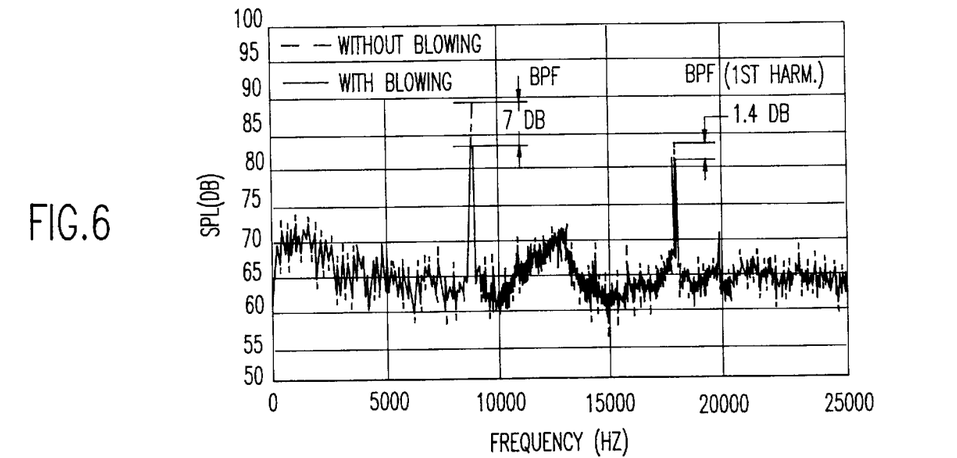
FIG. 6 is a graph, obtained by experimental test of the FIG. 2 embodiment in operation, of a frequency spectrum showing the reduction in blade-passing-frequency tone due to the blowing operation.

FIG. 6 is a frequency spectrum, in graphical form, obtained from actual experimentation of the FIG. 5 apparatus, showing the reduction in blade-passing frequency tone obtained with an air discharge through the ports 12i of the Table 1 prototype.

Figure 7A:
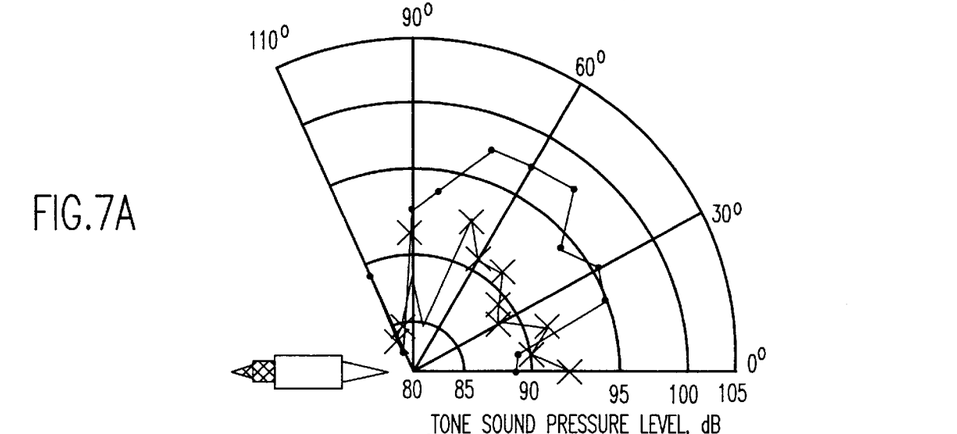
FIGS. 7A and 7B show, respectively, tone sound pressure level and overall sound pressure level taken along angular positions of a constant radius from a point in front of an engine, showing the reduction in noise level obtained with the present invention.
Figure 7B:
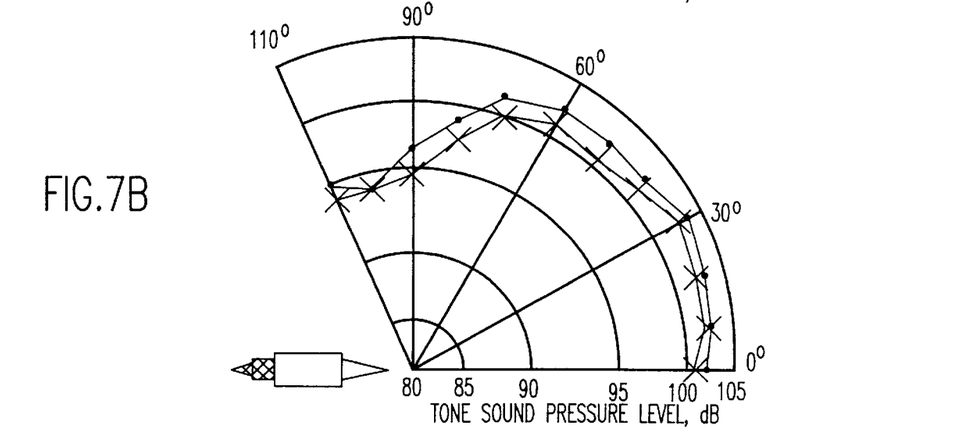

FIGS. 7A and 7B show the reduction in tone sound pressure level and overall sound pressure level, obtained from actual experimentation of the FIG. 5 apparatus operating at 30,000 RPM, in a 45 degree plane at points ranging from 0 degrees to 110 degrees off-axis. The magnitude is given in dB. The circular points represent data obtained without air discharge and the square points represent data with the air discharge.

Figure 8:
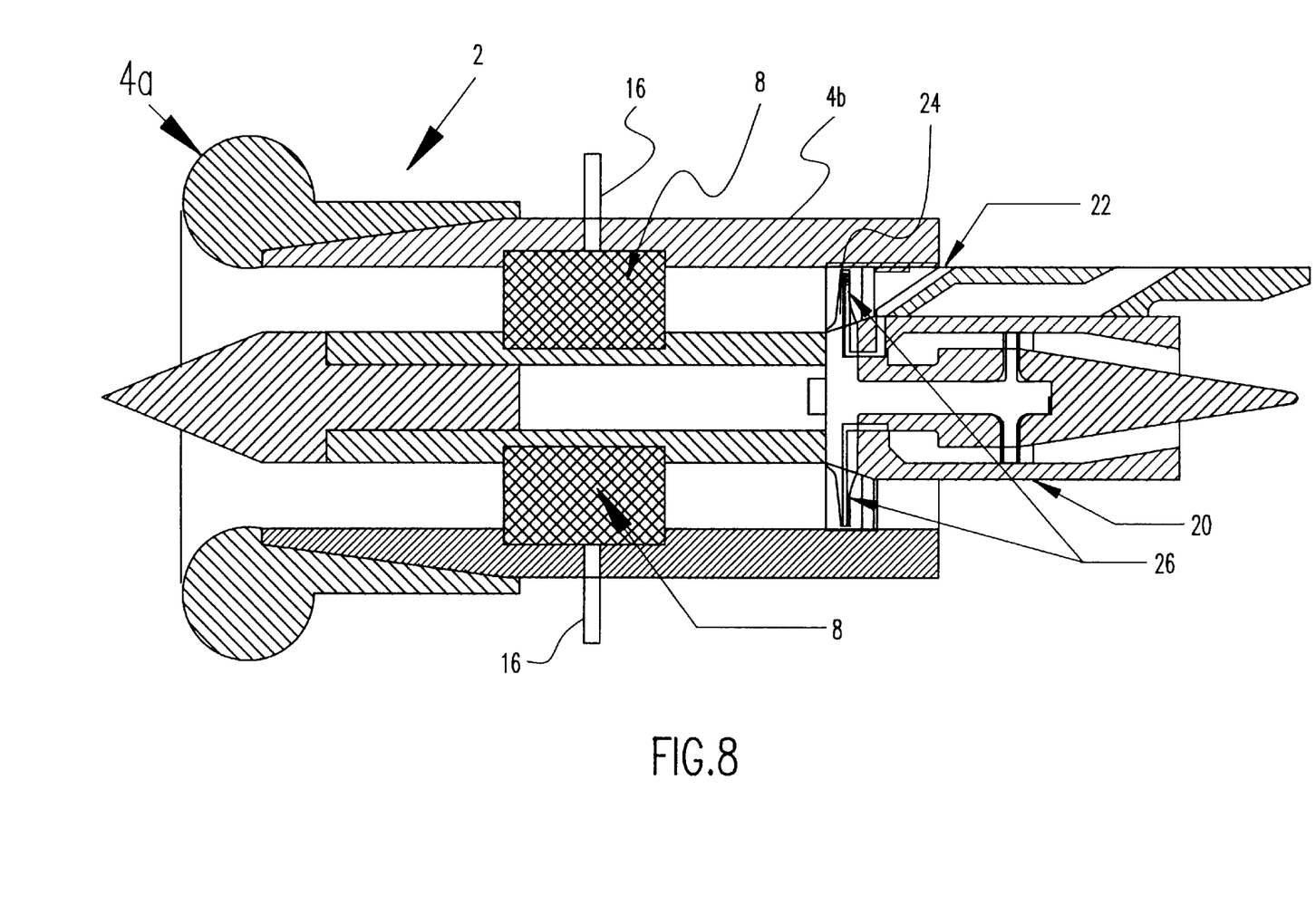
FIG. 8 is a cut-away side view showing a second embodiment of the present invention, having blowing orifices, or discharge ports, formed in the trailing edge of a rotor with increasing diameter along a radial direction.
Figure 9:
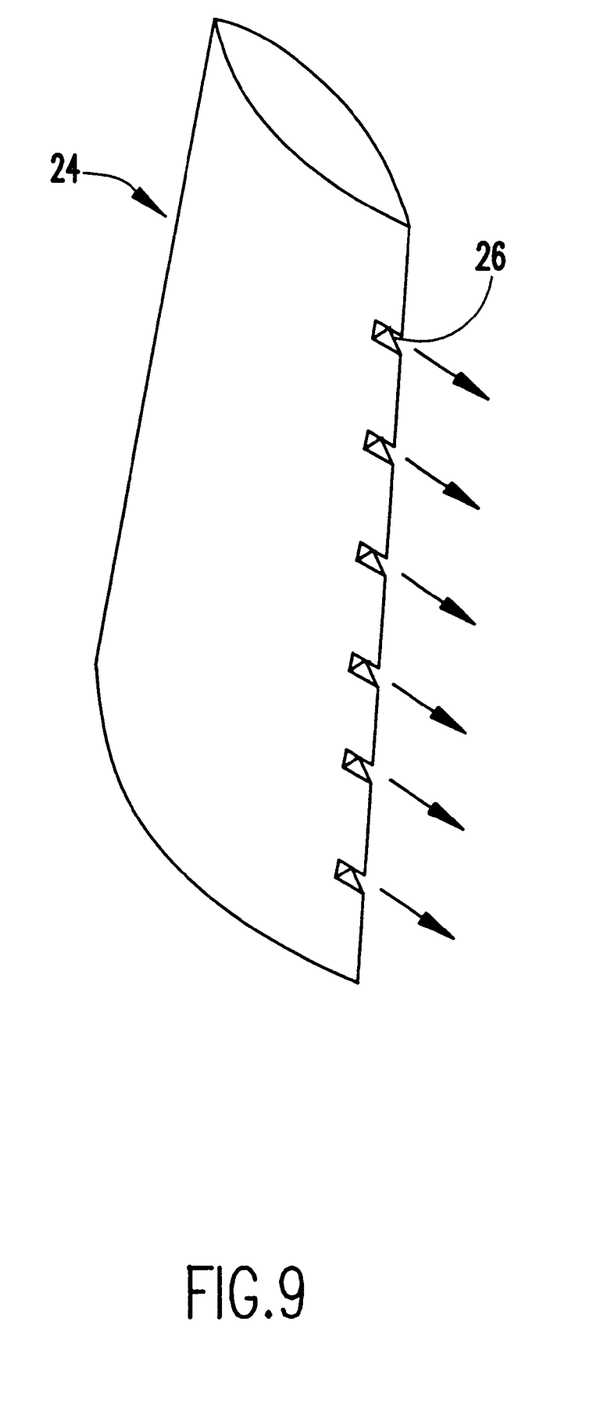
FIG. 9 is a perspective view of one of the rotor blades of the FIG. 8 embodiment, showing one preferred arrangement and example of preferred dimensions for the trailing edge blowing orifices.

FIGS. 8 and 9 show a further embodiment of this invention which uses air discharge from the trailing edge of the rotary machine rotor blade, in addition to trailing edge blowing from a stator assembly such as, for example, that of FIG. 1. More specifically, this embodiment comprises a blowing assembly 2 according to FIGS. 1, 2 and 3A through 3C, attached to a fan-jet 20 having an air feed 22 receiving pressurized air from a source (not shown) and, as shown in FIG. 9, communicating that pressurized air via slip ring type arrangement (not shown) through a passage (not shown) formed in the fanjet hub (not numbered) which communicates with a passage (not shown) formed in the rotor blade 24 which is similar to the plenum 10 of the stator 8. The rotor passage (not numbered) communicates with discharge ports 26 along the trailing edge of the rotor blades 24.

According to this embodiment, the discharge ports 26 are formed with diameters and restrictions to effect a minimized turbulence wake along the entire span of each rotor blade. The locations and dimensions of the discharge ports 24 are determined by substantially the same methods as are described above for the passages $12_i$ and exit ports $14_i$ of the stator 8, with the wind tunnel set to simulate the additional effect of the rotation of the rotor blades 26. Also, since the air enters the rotor blades 26 from the hub, as compared to the air entering the stator blades 8 from the tip end 8T, the diameters of the blowing holes 24 will be larger toward the rotor hub, which is opposite of the progression of the diameters of 12i and 14i along the stator 8.

The above-described embodiments use blowing passages and ports, such as $12_i$ and $14_i$, formed in the example stator blades 8, and blowing holes, such as 24, in the rotor blades 26. A further embodiment utilizes blowing slots (not shown) formed, for example, on stator members arranged, for example, like the four struts 8 of FIG. 1. The blowing slots (not shown) should have the same effective areas as the blowing passages and ports $12_i$ and $14_i$. Such blowing slots may provide a more uniform distribution of air flow for blowing, but may be more complicated and more costly to manufacture than the blowing holes, i.e., passages $12_i$ and ports $14_i$ and blowing holes 24.

A still further embodiment of this invention uses a tapered plenum (not shown) instead of the uniform diameter plenum 10 shown in FIGS. 3A–3C, to compensate for the back-pressure from the plenum end face 10A. With this embodiment, the plenum 10 will have a narrower diameter proximal to the inlet 10IN, and a wider diameter proximal to the end 10A. The progression in plenum diameter should be selected to substantially counterbalance the back pressure from the plenum end 10A, to obtain an approximately uniform pressure through the length of the plenum 10. As a result, the diameter $d_i$ of the passages $12_i$ could be uniform. It is preferable, for this embodiment, that the cross-sectional area of the channel 10 that should not be varied by a factor greater than five.

While the foregoing invention has been described with specific references to examples of its preferred embodiments, it should be understood that various substitutions, variations, and modifications may be made thereto without departing from the scope of the invention as defined in the appended claims. For example, although the blowing passages $12_i$ are shown in FIGS. 2 and 3A through 3C as introducing air in a direction substantially parallel to the air flow, the blowing air can be introduced at any angle with respect to the mainstream external flow over the blade 8. Further, blowing air can be introduced at any position along the chord of the blade, provides that the discharge velocity and volume rate distribution effects a substantially uniform minimized turbulence air flow in the wake of the blade 8. Still further, the shape of the blowing passages $12_i$ and the discharge ports $14_i$ can be circular or oval.

Having thus described our invention, what we claim as new and desire to secure by Letters Patent is as follows:

1. An apparatus for reduction of a turbulence or velocity defect of a medium entering an input of a rotary machine comprising:

a housing forming a passage for routing a main portion of the operating medium to the input of the rotary machine, the passage having an inlet and having an outlet having means for connection to the input of the rotary machine;

a plurality of struts for discharging a plurality of streams of a blowing medium into said passage, said plurality of struts arranged within said passage, each of said struts having a leading edge facing the inlet, a trailing edge facing the outlet, a plenum chamber having an input opening, and a plurality of discharging ports, said plurality of discharging ports extending from said plenum chamber to a corresponding plurality of exit ports, each of said exit ports proximal to said trailing edge; and means for pumping a quantity of said blowing medium into the input opening of the plenum chamber.

2. An apparatus for reduction of a turbulence or velocity defect of an operating medium entering an input of a rotary machine according to claim 1 wherein said means for pumping a quantity of said blowing medium into the input opening of the plenum chamber comprises a means for routing a portion of the operating medium from said rotating maching and wherein said blowing medium includes said portion.

3. An apparatus for reduction of a turbulence or velocity defect of an operating medium entering an input of a rotary machine according to claim 1 wherein a first of said discharge ports has a first diameter and a second of said discharge ports has a second diameter larger than said first diameter.

4. An apparatus for reduction of a turbulence of an oprating medium entering an input of a rotary machine according to claim 1 wherein said means for discharging a plurality of streams of a blowing medium discharges said streams out of said plurality of exit ports, said streams being at a substantially equal volumetric rate.

5. An axial flow fan, comprising:

a housing having an inlet and an outlet spaced apart from one another along a longitudinal axis;

a rotor positioned within said housing, said rotor having at least one rotating blade which rotates about said longitudinal axis;

a stator positioned within said housing between said inlet and said rotor, said stator having a leading edge and having a trailing edge between said leading edge and said rotor; and means for discharging a medium from the trailing edge of said stator.

6. An axial flow fan according to claim 5 wherein said means for discharging a medium comprises:

a plurality of ports within the stator, each opening at one end to a corresponding one of a plurality of exit ports located along the said trailing edge, and each opening at another end to a port input; and means for pumping a quantity of the medium into said port input.

7. An axial flow fan according to claim 5 wherein said exit ports are spaced a uniform distance from one another along an axis extending radially from the longitudinal axis.

8. An axial flow fan according to claim 5, wherein said means for discharging a medium discharges said medium at a pressure based on a rotational rate of said rotor.

* * * * *